United States Patent [19]

Hoke et al.

[11] 4,047,821

[45] Sept. 13, 1977

[54] BREAK-RESISTANT TELESCOPING TOOL

[75] Inventors: Jack B. Hoke; Richard Graham, both of Centralia; Richard H. Hoffman, Moberly, all of Mo.

[73] Assignee: A. B. Chance Company, Centralia, Mo.

[21] Appl. No.: 732,056

[22] Filed: Oct. 13, 1976

Related U.S. Application Data

[63] Continuation of Ser. No. 558,433, March 14, 1975, abandoned.

[51] Int. Cl.² .............................................. F16B 7/10
[52] U.S. Cl. .................................... 403/109; 403/328; 24/265 B
[58] Field of Search ............... 403/104, 106, 108, 109, 403/328, 324; 428/35, 36, 412; 339/109; 24/265 B

[56] References Cited

U.S. PATENT DOCUMENTS

| | | | |
|---|---|---|---|
| 2,606,050 | 8/1952 | Morris et al. | 403/328 |
| 3,474,833 | 10/1969 | Garrette et al. | 285/302 X |
| 3,750,238 | 8/1973 | Tanner | 24/265 B |
| 3,980,409 | 9/1976 | Turner | 403/328 X |

*Primary Examiner*—Wayne L. Shedd
*Attorney, Agent, or Firm*—Schmidt, Johnson, Hovey & Williams

[57] ABSTRACT

An elongated, lightweight, insulative, multi-section, break-resistant telescoping tool especially adapted for work around energized electrical lines is disclosed which overcomes breakage problems heretofore encountered in tools of this type by provision of closely fitting, reciprocable, telescoping sections having imperforate bases which preclude air flow centrally through the sections to thereby prevent the quick escape of air from adjacent, surrounding sections during nesting retraction of the tool which serves to cushion such retractive movement and prevent inadvertant breakage of the sections. Spring-loaded buttons are provided for releasably securing the sections in an extended position and are formed of high-impact, shear-resistant deformable synthetic resin material so that the buttons can safely absorb shocks resulting from an accidental dropping of the tool without breakage of the tool sections or the buttons themselves. The tool sections advantageously include an outer tube formed of flexibilized epoxy resin and an inner fiberglass reinforced sleeve received within the tube and bonded thereto by means of a polyurethane foam which absorbs a portion of the transverse loads imposed iupon the sections by the buttons during an accidental dropping of the tool.

3 Claims, 8 Drawing Figures

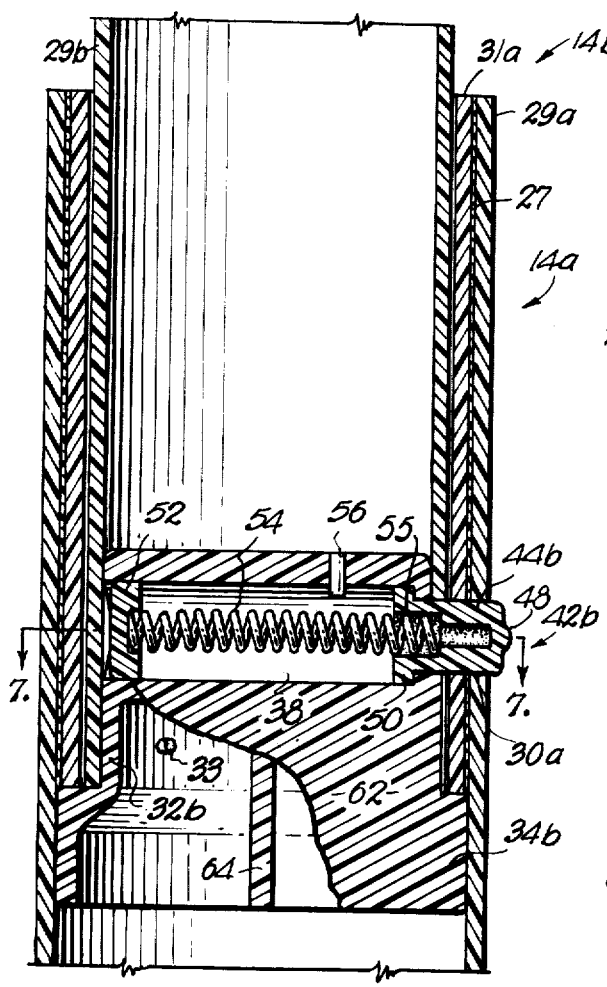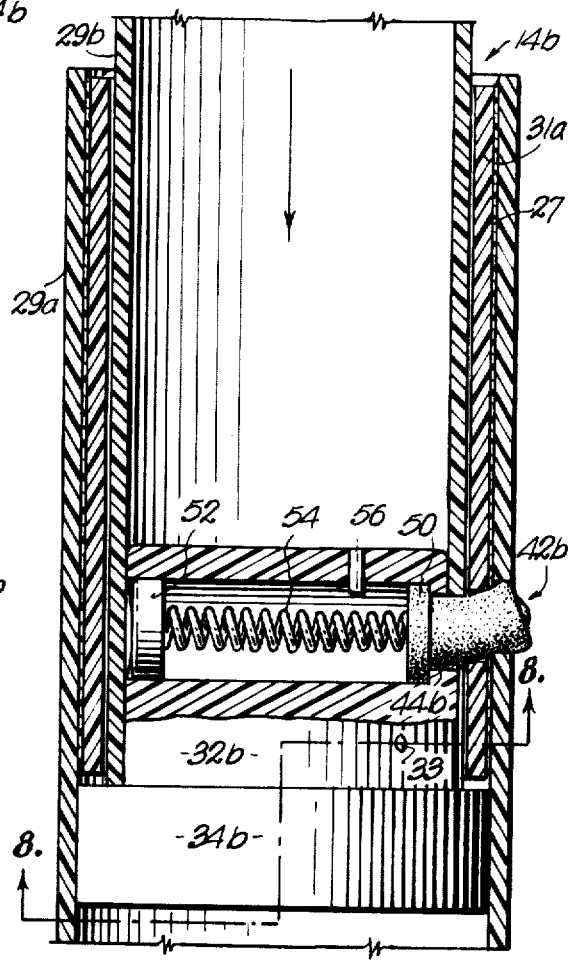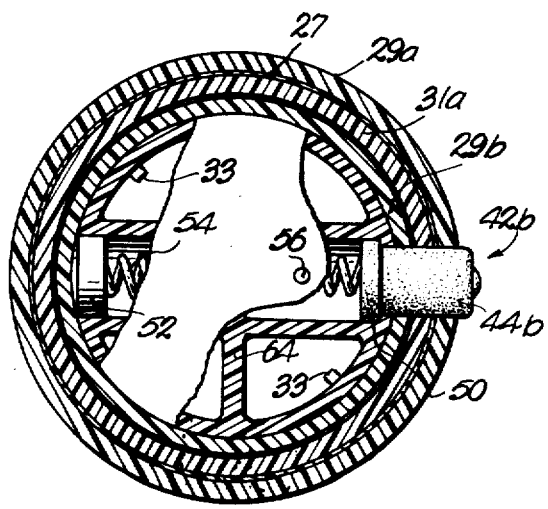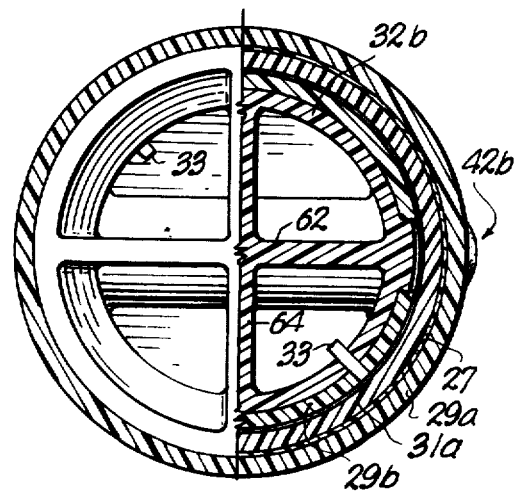

BREAK-RESISTANT TELESCOPING TOOL

This is a continuation of application Ser. No. 558,433 filed on Mar. 14, 1975, now abandoned.

This invention relates to an elongated, insulative, break-resistant tool composed of reciprocable, telescopically interfitted tubular sections which is especially adapted for use in repairing energized electrical transmission and distribution equipment and the like. More particularly, it is concerned with a tool of the type described which is provided with various specialized features for enhancing the breakresistance thereof and otherwise rendering the tool more rugged and fit for rough handling encountered in the field. These features include provision of untapered, closely fitting telescopically interfitted sections having air blocking bases thereon such that a piston-like cushioning is provided during retraction of the tool sections, along with spring-biased stop buttons formed of high impact, shear-resistant deformable material which can safely absorb shock loads without breakage. In addition, the separate tool sections include outer tubular sections formed of an epoxy resin composition, along with a fiberglass reinforced epoxy inner sleeve bonded thereto by means of a foam-type material which is capable of absorbing transverse loads imposed upon the tool sections to prevent breakage thereof.

Electrical utilities and others have for a number of years made use of elongated insulative tools enabling linemen to safely repair energized transmission and distribution equipment from ground level or at a safe, remote location from such equipment. These tools must of necessity be lightweight and of sufficient length for the intended purpose (up to 35 feet), while also being portable and easy to handle and manipulate during use. In the past tools of this type have been of fixed length, but this is undesirable because of the bulkiness thereof and the inherent limitations on the length of the tool by virtue of the necessity of portability. In response to these problems, multi-section telescopic tools have been proposed which can be selectively extended for work purposes and thereafter retracted to permit easy transport and storage of the tool. Units of this type (e.g., such as disclosed in U.S. Pat. No. 2,980,456) may include a plurality of tapered, axially reciprocable, telescopically interfitted sections carrying spring-biased buttons for releasably securing the sections in the extended positions thereof.

While telescoping tools have found a degree of acceptance in the art, they nevertheless have been plagued with a number of serious defects. For example, the compromises made in tool design between the conflicting goals of ruggedness and lightness have made such prior tools susceptible to breakage if dropped when the sections thereof are extended. Specifically, if an extended tool of this type is dropped only a few feet onto the base thereof, the reactive movement of the sections can cause the projecting stop buttons to break or shear, thus necessitating replacement thereof. Furthermore, if the buttons are simply made stronger to prevent such breakage, the wall of the adjacent tubular section can be broken because the destructive reaction forces are merely transmitted through the buttons. Thus, it will be appreciated that simply strengthening selected components of the tool will not serve to appreciably enhance the overall break-resistance thereof.

Serious damage to prior telescoping tools can also occur during normal retraction thereof should the user loose his grip on a section being retracted. If this occurs, the section (and all sections thereabove) descends rapidly under the influence of gravity and the button on the section next above that which was released can strike the upper rim of the adjacent, surrounding section with a destructive force. This in turn can cause the stop buttons in the remaining extended sections to shear in a cascading fashion, or can actually cause longitudinal cracks in the sections themselves adjacent the button holes therein. Thus, linemen and others working with the insulative telescoping tools heretofore available have had to exercise an undue amount of caution with the tools lest the latter become broken and inoperative because of a relatively minor accident.

It is therefore the most important object of the present invention to provide an elongated, insulative, multisection telescoping tool which is rendered extremely breakresistant to normal shocks encountered during use in the field by virtue of the configuration of the tool sections which assures a close, piston-like fit between the sections to prevent the quick escape of trapped air from the latter upon nesting retraction of the tool. In this manner the tool sections are prevented from "free falling" because of the air cushioning effect that is provided between the sections which prevents breakage thereof in the event of an accidental release of one of the tool sections during the retraction sequence.

Another object of the invention is to provide a tool of the type described wherein the spring-loaded stop buttons associated with each of the nestable sections in order to releasably secure the same in an extended work position are formed of a high-impact, shear-resistant deformable material such as a polycarbonate synthetic resin which is capable of absorbing potentially destructive forces imposed thereon during an accidental dropping of the tool onto its base, so that the buttons will not break in the event of such an accident but rather will deform or distort while remaining in an otherwise operative condition so that their replacement is not needed.

A still further object of the invention is to provide a break-resistant telescoping tool wherein the tubular sections thereof are formed of an outermost tube composed of a glass reinforced, flexibilized epoxy resin composition, with an inner fiberglass-reinforced cured epoxy resin sleeve bonded thereto by means of a foam-type material (such as a polyurethane) which serves to absorb at least a portion of any transverse loads imposed upon the tool sections during use thereof. The foam material not only serves as a type of cushion between the rigidified tube and sleeve members, but moreover provides an excellent gap-free bond therebetween because of the foaming action of the adhesive material which substantially eliminates troublesome voids which can result from sleeve and tube wall thickness variations.

A still further object of the invention is to provide a multi-section telescoping tool wherein the inner, fiberglass-reinforced sleeves of the respective sections are composed of a cured, epoxy resin material reinforced with fiberglass, with from about 50 to 75% of the glass being positioned in a circumferential direction relative to the axis of the sleeve in order that sufficient circumferential strength is provided to minimize compressive buckling under cantilever load situations and prevent longitudinal splitting of the section walls under accident-induced impact conditions or the like.

In the drawings:

FIG. 5 is an enlarged, vertical sectional view of a pair of telescopically interfitted tool sections, with the spring-loaded stop button mechanism of the inner section shown in its operative movement-blocking disposition;

FIG. 6 is an enlarged, vertical sectional view similar to that of FIG. 5, but showing the operation of the tool under an accidental impact situation when the latter is dropped vertically on its base;

FIG. 7 is a sectional view taken along lines 7—7 of FIG. 5 and further illustrating the internal construction of the tool sections; and FIG. 8 is a partial sectional view taken along irregular line 8—8 of FIG. 6 and further showing the construction of the tool.

Figure 1:
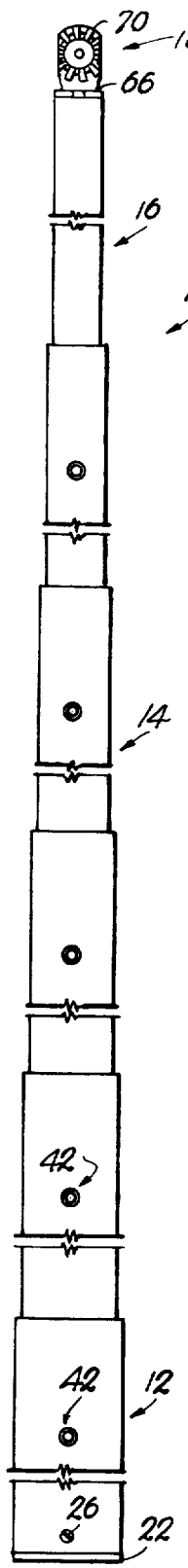
FIG. 1 is a fragmentary, side elevational view of a telescoping tool in accordance with the invention, shown with the respective sections thereof in an extended, work position.

A telescoping tool 10 in accordance with the invention is illustrated in FIG. 1 and broadly includes a plurality of elongated, hollow tubular, axially reciprocable, telescopically interfitted sections. A lowermost section 12 of greatest diameter is provided, along with a series of intermediate sections 14 of progressively smaller diameter, with an uppermost section 16 terminating in a tool implement 18. Each section of tool 10 is of untapered, constant diameter configuration along the respective lengths thereof as will be readily apparent from the drawings. It will also be appreciated that a given tool 10 can include as few or as many intermediate sections 14 as are necessary to provide a tool of desired length. As depicted in FIG. 1, the lowermost section 12 is of relatively large diameter with each of the intermediate sections being of decreasing diameter in order to permit nestable retraction of the respective sections into one another so that the tool can be stored and transported as a relatively compact unit.

Figure 2:
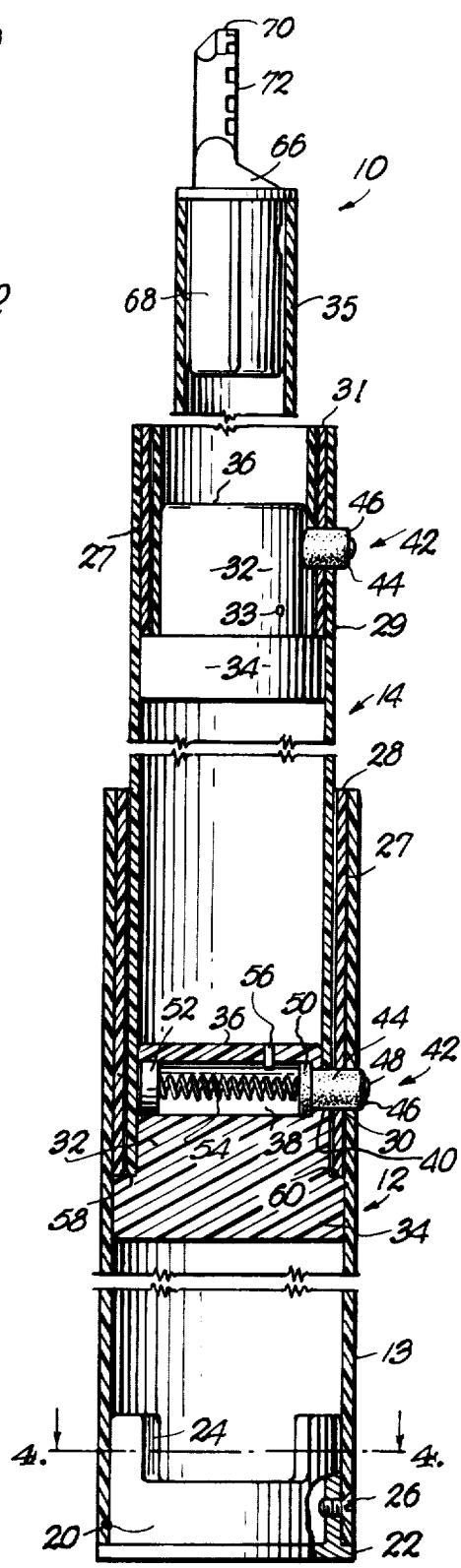
FIG. 2 is an enlarged, fragmentary vertical sectional view of the tool illustrated in FIG. 1.
Figure 3:
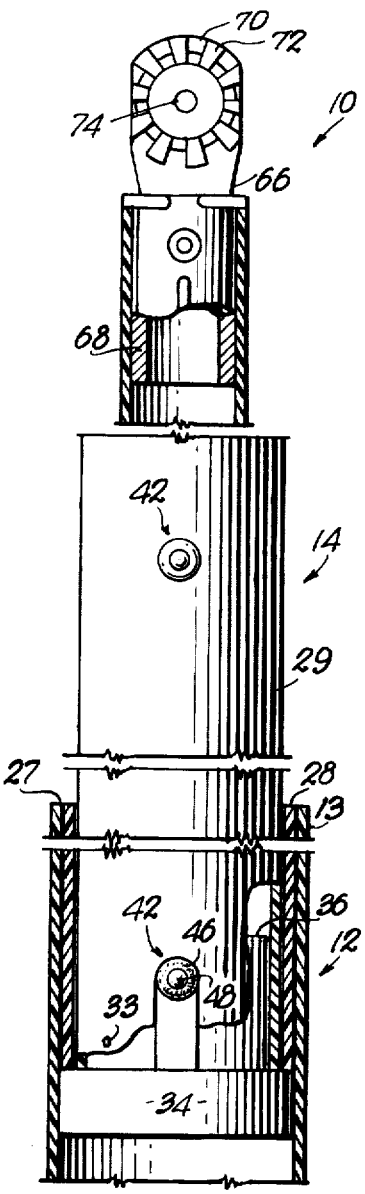
FIG. 3 is an enlarged, fragmentary view in partial vertical section of the pole illustrated in FIG. 1, with certain parts being broken away for clarity.
Figure 4:
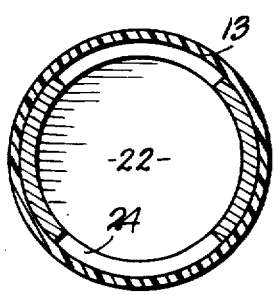
FIG. 4 is a sectional view taken along line 4—4 of FIG. 2 and illustrating the base fitting of the tool.

Referring now to FIGS. 2-4, it will be seen that lowermost section 12 is in the form of a tubular member 13 having a plate-like, imperforate, air-blocking base fitting 20 of glass filled synthetic resin which is telescopically received within the lowermost end thereof and defines the bottom of tool 10. Fitting 20 includes a radially expanded, generally planar base portion 22 with an upstanding, irregular shoulder section 24 situated within the confines of member 13. Three screws 26 equidistantly spaced around the periphery of fitting 20 extend through the sidewall of member 20 and thereby firmly secure base fitting 20 in position.

As shown, member 13 of section 12 is a constant diameter tubular member which is preferably fabricated from an insulative synthetic resin material such as a glass-reinforced, flexibilized epoxy resin. In addition, an inner tubular sleeve 28 is positioned within the upper portion of member 13 for the purpose of rigidifying the latter in order to increase the break-resistance thereof. Sleeve 28 is preferably a fabricated, fiberglass-reinforced epoxy resin member and is advantageously bonded to the internal wall surface of section 12 by means of a polyurethane foam material 27 later to be described. A buttonreceiving aperture 30 is also provided through the bonded inner sleeve 28 and member 13 intermediate the ends of the latter. In this regard, each of the intermediate sections 14 of tool 10 likewise is fabricated from a constant diameter hollow tubular outer epoxy member 29 with a glass-reinforced epoxy inner sleeve 31 received within the upper end thereof and bonded thereto by means of foam adhesive 27. On the other hand, uppermost sections 16 is preferably filled with polyurethane foam and has only an outer epoxy member 35 without an inner sleeve.

Referring specifically to FIG. 2, it will be seen that the intermediate sections 14 of tool 10 are telescopically interfitted one within the other so as to present an extensible, multi-section tool. For example, the lowermost intermediate section 14 is fitted within the hollow tubular confines of section 12, and additional sections of decreasing diameter are positioned within the largest diameter intermediate section until a tool of desired length is fabricated. In this regard, each of the sections 12, 14 and 16 are configured such that a tight sliding fit is maintained throughout the length of tool 10, which is important for purposes to be made clear hereinafter. Additionally, each section 14 (and uppermost section 16) is provided with a glass filled synthetic resin, cuplike, open bottom base 32 having a radially expanded lowermost section 34 and a closed, imperforate top wall 36. The top wall 36 of each base 32 extends completely across the corresponding openings presented by the lowermost ends of the respective sections in order to close off the same and preclude airflow centrally through the sections. The respective bases 32 are secured in place within the corresponding tubular sections and by means of spaced roll pins 33 which extend through the sidewall of the surrounding sections and bodies of the bases (see FIGS. 7 and 8).

Each base 32 also includes an elongated, transversely oriented, generally cylindrical, button-receiving chamber 38 which communicates with an aperture 40 in the sidewall of base 32 adjacent the top thereof. A shiftable stop button 42 composed of a high impact, shear-resistant deformable material is positioned within the chamber 38 and includes an elongated shaftlike portion 44 having rounded outermost shoulders 46 and an upraised central projection 48. Each button 42 is provided with a radially enlarged, annular collar 50 which is dimensioned to closely fit within the defining walls of chamber 38 and preclude passage of the buttons 42 completely out of the corresponding bases 32. A spring pad 52 is situated adjacent the end of each chamber 38 remote from aperture 40 and serves as a pad for one end of helical spring 54 situated within the same. The remaining end of the spring 54 fits within a complemental recess 55 (see FIG. 5) provided in each button 42 and bears against the same to urge the respective buttons 42 radially outward relative the longitudinal axis of tool 10. Finally, a depending pin 56 is positioned within each top wall 36 and extends into the corresponding chamber 38 for the purpose of preventing the complete retraction of the buttons 42 within the associated chambers 38.

It will also be seen that each base 32 and buttonreceiving chamber 38 are positioned such that when adjacent sections are axially extended relative to one another, the button 42 of the internal section will snap into the aperture 30 provided in the defining sidewall of the surrounding section. Referring to FIG. 2, it will be seen that the distance between the botton edge 58 of inner sleeve 28 and aperture 30 corresponds to the distance between the uppermost edge 60 of radially expanded base portion 34 and aperture 40. Thus, automatic indexing of the buttons 42 and apertures 30 is assured when the sections of the tool are extended to their greatest extent. Each base 32 provided in the five lowermost sections of the tool includes a pair of central, perpendicularly oriented reinforcing webs 62 and 64 which are situated beneath chamber 38 and integrally secured to the inner face of the annular sidewalls of the cup-like bases 32. Although not specifically illustrated in detail in the drawings, it is to be understood that each intermediate section 14 of tool 10 (along with uppermost section 16) is provided with a base 32 substantially identical to that described but, of course, being differently dimensioned in each instance because of the variance in diameter between the telescoped sections.

Referring specifically to FIG. 3, it will be seen that tool implement 18 is in the form of a unitary indexing member 66. Member 66 includes a depending tubular section 68 which is adhesively secured within the uppermost open end of member 35, along with an upright, apertured indexing plate segment 70 connected thereto. Plate segment 70 includes a series of circumferentially positioned teeth 72 along with a central aperture 74, in order to provide attachment structure for any one of a number of tools desired for use in particular work applications.

As alluded to briefly above, each of the separate tubular sections of tool 10 save for uppermost section 16 preferably include an outermost, apertured, glass reinforce flexibilized synthetic resin tube (such as member 13 of section 12 or members 29 of the intermediate sections) having a reinforcing sleeve received within the upper end thereof and bonded thereto by means of a foam-type adhesive 27. In practice, it has been found that an excellent foam adhesive can be prepared using equal parts of isocyanate and polyol, such as the Polylite 34-843 and Polylite 4507-37A materials sold by Reichhold Chemicals, Inc. of White Plains, New York. Furthermore, the epoxy casting material preferred for use in fabricating the tubular members and reinforced sleeves of the invention is a Bisphenol A-epichlorohydrin resin material such as that sold by the Shell Chemical Company under the trade designations Epon 828 and Araldite 6010. However, other types of epoxy resins or foam materials can also serve the purposes of the invention. In practice, the foam adhesive is applied between the sections and sleeves and the foaming action thereof serves to ensure an adequate bond therebetween while also filling any voids resulting from variations in the respective wall thicknesses.

In the case of the glass-reinforced inner sleeves 28 however, a certain degree of criticality has been observed. Specifically, it was unexpectedly found that the glass should be placed within the sleeve such that from about 50 to 75% thereof (preferably about 63%) is oriented generally circumferentially of the tubular sleeves. If lesser circumferential support is provided, the sleeve, and for that matter the entire section, is subject to compressive buckling when subjected to cantilever loads, or will longitudinally split in the area of the button-receiving aperture under impact conditions. In practice, coated style 7781 woven fiberglass (yarn in warp and fill, DE 75-1/10, as woven, warp 57 and fill 54, having a thickness of 0.009 in., a weight of 8.95 oz./sq. yd., a tensile strength of 590 lb./in. warp, 356 lb./in. fill and a weave of 8 shaft satin) has proven to be satisfactory.

Finally, the deformable buttons 42 are preferably formed of a high-impact, shear-resistant polycarbonate material which has a ⅛ inch notched Izod impact strength of from about 10 to 20 ft. lb./in. An exemplary material of this class is the Merlon M-40 product sold by the Mobay Chemical Company of Pittsburgh, Penn., which is characterized by a specific gravity of 1.2, a tensile strength of 9,500 psi, an elongation of 130%, a flexural modulus of elasticity of $3.5 \times 10^5$ psi and an impact strength (⅛ inch notched Izod) of 16 ft. lb./in.

In practice, when it is desired to employ tool 10 in accordance with the invention, the respective sections thereof are axially extended relative to one another until the separate buttons 42 associated with each intermediate sections 14 and the uppermost section 16 come into alignment with the apertures 30 provided in the sidewalls of the adjacent, surrounding sections. As explained, the indexing between the corresponding buttons 42 and apertures 30 is greatly facilitated by virtue of the fact that when the upper edges of the radially expanded base sections 34 abut the underside of the adjacent inner sleeves, the elements are longitudinally aligned and it is only necessary to rotate the section relative to each other until the stop buttons 42 snap into place under the bias of springs 54. This has the effect of releasably securing the sections in an extended, work position as depicted in FIG. 1.

When work with tool 10 is completed, it is only necessary for the user to sequentially depress the separate buttons 42 (generally starting from the lowermost button and working up as the sections are nestably retracted) and slide the adjacent nestable sections into one another such that the outermost faces of the buttons are in engagement with and are retained in a retracted position by the inner surfaces of the surrounding tubular members.

If a tool in accordance with the invention is dropped during use thereof so that the tool lands on lowermost base 20, the following occurs to prevent substantial damage to the tool. Referring to FIGS. 5 and 6 where a pair of interfitted intermediate sections 14a and 14b are depicted, it will be seen that prior to dropping button 42b is received in the normal manner within aperture 30a provided through sleeve 31a and member 29a. However, during such a dropping sequence the section 14a transmits a potentially destructive, upwardly directed reaction force to button 42b because of the dropping impact. In the case of normal buttons heretofore provided in telescoping tools, such reactive forces can and often do cause a complete shearing of the button, which in turn allow the sections to drop downwardly under the influence of gravity past sheared buttons. This of course can cause a further shearing of the buttons thereabove since the buttons in the free-falling sections can strike the top edges of the adjacent, surrounding sections and thus become broken or sheared. In practice, it is not uncommon to shear several stop buttons when the poles heretofore available are dropped only a very few feet onto the base thereof. In the present invention however, this result is avoided by provision of buttons 42 formed of high impact, shear resistant deformable material such as the polycarbonate synthetic resin described above. Referring specifically to FIG. 6 it will be seen that button 42b is capable of deforming and distorting without shearing under the reactive forces transmitted through adjacent tubular sections 14a and 14b. In fact, an accident as described may only have the effect of producing an annular groove about the shank 44b of buttons 42b, but will generally not shear the same or otherwise render the tool inoperative.

In addition, any transverse loads imposed upon the tool section by virtue of the shear forces imposed upon button 42b are successfully absorbed by virtue of the foam adhesive material used to bond the sleeve 31a and tubular member 29a. Absent such a cushioning effect, the tools of prior art have been known to not only shear the stop buttons but also cause longitudinal cracks in the section walls adjacent the button receiving apertures thereof; however, in the present invention this undesirable result is successfully overcome.

Another very important feature of the present invention involves the air-cushioning effect produced between adjacent, interfitted sections during axial retraction thereof into one another. This stems from the use of tubular sections which are in closely fitting, sliding engagement, and from employment of air-blocking bases serving to preclude flow of trapped air centrally through the sections. That is, and referring to FIGS. 5 and 6, during retraction of section 14b into section 14a, the trapped air within the latter must travel around the radially expanded base portion 34b of base 32b and ultimately through the very small space between inner sleeve 31a and tubular member 29b of section 14b for passage to the atmosphere out the open end of section 14a. This produces an air cushioning effect between the adjacent sections to facilitate safe axial retraction thereof and substantially precludes the possibility that the sections could free-fall and ultimately strike each other with a destructive force, even if the operator should lose his grip on section 14b being retracted. Should such an accident occur, the trapped air within the surrounding section cushions and slows the descent of the falling section to thereby ensure that the latter does not strike the base of the surrounding section with a destructive force or shear other stop buttons provided with tool 10.

Finally, the close piston-like fit between the tool sections improves the stability of the pole when extended by virtue of the fact that the characteristic "wobble" between sections is minimized which in turn facilitates precise manipulation of the tool. Also, the close fit of the sections serves to reduce the buildup of contamination on the tool since a "wiping action" is produced during extension and retraction of the sections relative to one another.

Having thus described the invention, what is claimed as new and desired to be secured by Letters Patent is:

1. In an extensible telescoping tool:

a plurality of elongated, tubular, axially reciprocable, telescopically interfitted sections formed of a fiberglass reinforced synthetic resin material, each of said sections being configured and arranged relative to each adjacent section to assure a smooth, sliding fit therebetween;

means secured to each nestable section for substantially precluding airflow therethrough upon axial, nesting retraction thereof into the adjacent, surrounding section, and for diverting said airflow externally of the nestable section for passage thereof between the latter and said surrounding section, the interfitting of said sections, and the configuration and location of said air precluding and diverting means, serving to cushion and slow the travel of said sections during said nesting retraction thereof for preventing damage to said sections in the event that the latter are allowed to retract in a free-falling manner;

means for releasably securing said sections in an axially and rotationally locked, extended position relative to each other to stabilize said sections against normally experienced tensile, compressive and torsional loads, said securing means including an elongated, shiftable, generally transversely oriented button having a shank portion and situated within each of said nestable sections, and means biasing the respective buttons outwardly relative to the corresponding sections, there being a button-receiving aperture in each of said surrounding sections which extends through the sidewall and fiberglass reinforcement thereof for receiving a corresponding button, with the shank of the latter engaging the opening-defining walls of said section, each of said buttons having the shank portion thereof formed of a shear resistant, deformable synthetic resin material having a ⅛ inch notched Izod impact strength of from about 10 to 20 ft. lb./in., said deformable shank portions, and the corresponding surrounding sections and fiberglass reinforcement thereof, being cooperable for absorbing potentially destructive shocks developed when the tool is in an extended position and is dropped on its end, said shock absorbing occurring by virtue of the deformation of said buttons when said tool is dropped, with consequent impact loads being transmitted through said sections, fiberglass reinforcement, and buttons for absorbing said shocks without shearing of said buttons or cracking of said surrounding sections.

2. In the tool as set forth in claim 1, said button shanks are formed of high impact polycarbonate material.

3. In the tool as set forth in claim 1, there being at least three of said interfitted sections.

* * * * *